United States Patent Office 3,808,259
Patented Apr. 30, 1974

3,808,259
15-OXOPROSTANOIC ACID
Kiyoshi Sakai, Mitsuo Yamazaki, Shigeo Amemiya, Takashi Yusa, and Masaaki Sasaki, Tokyo, Japan, assignors to Sankyo Company Limited
No Drawing. Filed Aug. 28, 1972, Ser. No. 284,337
Claims priority, application Japan, Sept. 9, 1971, 46/70,002
Int. Cl. C07c *61/36, 69/74*
U.S. Cl. 260—468 D                 5 Claims

ABSTRACT OF THE DISCLOSURE

Novel 15-oxoprostanoic acid derivatives having the formula

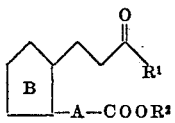

wherein A represents a straight or branched alkylene group having from 1 to 10 carbon atoms, $R^1$ represents a straight or branched alkyl group having from 1 to 10 carbon atoms, $R^2$ represents hydrogen atom or a straight or branched alkyl group having from 1 to 5 carbon atoms and the formula

represents a cyclopentylene group selected from the formulae

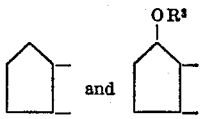

wherein $R^3$ represents hydrogen atom or tetrahydropyranyl group and the pharmaceutically acceptable salts thereof.

The products are useful as a suppressant of uterine contraction in pregnant women and as an intermediate for the corresponding 15-hydroxyprostanoic acid derivatives which exhibit a uterine contracting activity and inhibit an activity of 15-hydroxyprostaglandin dehydrogenase. The products are prepared by subjecting the 15-oxoprost-13-enoic acid derivatives having the formula

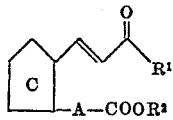

wherein A, $R^1$ and $R^2$ are the same as above and the formula

represents a cyclopentylene or cyclopentenylene group selected from the formulae

wherein $R^3$ is the same as above to catalytic reduction.

---

This invention relates to novel 15-oxoprostanoic acid derivatives which are useful as a suppressant of uterine contraction in pregnant women and to a process for the preparation thereof.

More particularly, it relates to 15-oxoprostanoic acid derivatives having the formula

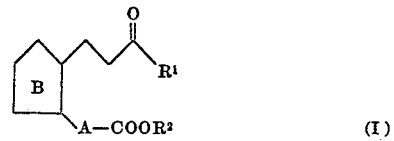

wherein A represents a straight or branched alkylene group having from 1 to 10 carbon atoms, preferably from 4 to 8 carbon atoms, $R^1$ represents a straight or branched alkyl group having from 1 to 10 carbon atoms, preferably from 3 to 7 carbon atoms, $R^2$ represents hydrogen atom or a straight or branched alkyl group having from 1 to 5 carbon atoms and the formula

represents a cyclopentylene group selected from the formulae

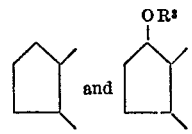

wherein $R^3$ represents hydrogen atom or tetrahyropyranyl group and, when $R^2$ is hydrogen atom, the pharmaceutically acceptable salts thereof and relates also to a process for the preparation thereof.

The pharmaceutically acceptable salts of the compounds of this invention include the non-toxic metallic salts such as sodium, potassium, calcium and aluminum and the salts of non-toxic amines such as trialkylamines, e.g., triethylamine and procaine; N-alkylpiperidine, e.g., N-methylpiperidine and N-ethylpiperidine; and morpholine.

A preferred group of 15 oxoprostanoic acid derivatives of the Formula I are those in which A represents hexamethylene and $R^1$ represents pentyl group, i.e., 15-oxoprostanoic acid derivatives having the formula

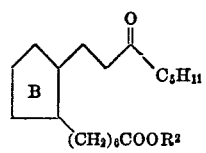

wherein $R^2$ and the formula

are the same as above.

As a result of various investigations, we have unexpectedly found that the present Compounds I exhibit a suppression activity of uterine contraction. For example, contraction in pregnant rat uterus caused by intraveneous administration of 70 µg./kg. prostaglandin F $2\alpha$ or 6 µg./kg. of prostaglandin $E_2$ is completely suppressed by intravenous administration of 4 mg./kg. of 15-oxoprostanoic acid. The present Compound I is therefore useful as a suppressant of uterine contraction in pregnant women. For example, it is useful in treating threatened abortion in pregnant women. This compound may be formulated with suitable excipients for administration by injection. From about 50 mg. to about 500 mg. of this compound can be administered daily to the pregnant woman in divided doses. Furthermore, it has been unexpectedly found that the activities of prostaglandin dehydrogenase are hindered by the novel 15-hydroxyprostanoic acid derivatives having the formula

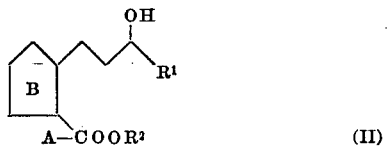

(II)

wherein $R^1$, $R^2$, A and the formula

are as defined above which may be prepared by reducing the 15-oxoprostanoic acid derivatives (I) with a metal hydride complex, e.g. sodium boron hydride.

For example, 50% inhibition concentration of 15-hydroxyprostanoic acid for 15-hydroxyprostaglandin dehydrogenase is $0.4 \times 10^{-5}$ M [tested by the method reported by E. Änggärd and B. Samuelsson in Arkiv För Kemi, 25, 293 (1966)].

The Compounds II are usually administered together with known prostaglandins in a molar ratio of 200–500:1 by intravenous injection in order to prolong the activities of prostaglandins. When they are used as an uterine contraction agent, the parenteral total daily dosage for termed pregnant women is of about 50–130 mg.

According to the process of the present invention, the 15-oxoprostanoic acid derivative (I) can be prepared by subjecting a 15-oxoprost-13-enoic acid derivative having the formula

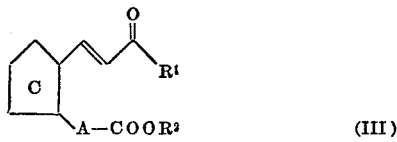

(III)

wherein A, $R^1$ and $R^2$ are the same as above and the formula

represents a cyclopentylene or cyclopentenylene group selected from the formulae

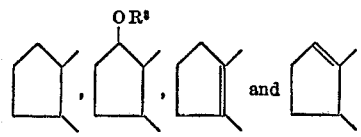

wherein $R^3$ is the same as above to catalytic reduction.

The catalytic reduction may be preferably carried out by contacting a solution of the Compound III with hydrogen in the presence of a catalyst. As the catalyst which may be used in the reaction, there may be employed platinum catalyst such as platinum wire, platinum plate, platinum black, spongy platinum, platinum oxide and colloidal platinum; palladium catalyst such as palladium black, palladium oxide, colloidal palladium, anhydrous colloidal palladium, palladium-barium sulfate, palladium on charcoal, palladium on barium- or strontium carbonate and palladium on silica gel; rhodium catalyst such as rhodium asbestos and colloidal rhodium; iridium catalyst such as iridium asbestos and colloidal iridium; nickel catalyst such as reduced nickel catalyst, nickel oxide catalyst, Raney nickel catalyst, Urushibara nickel catalyst and nickel boride catalyst; cobalt catalyst such as Raney cobalt catalyst, reduced cobalt catalyst and Urushibara cobalt catalyst; iron catalyst such as reduced iron catalyst and Raney iron catalyst; copper catalyst such as reduced copper catalyst, copper on carrier and Raney copper catalyst. As the solvent, there may be employed any solvent without limitation that would not adversely affect the reaction. Preferable examples of such a solvent include water; alcohols, e.g., methanol, ethanol and ethylene glycol; ethers, e.g., diethyl ether, dioxane and tetrahydrofuran; hydrocarbons, e.g., benzene, toluene, cyclohexane and methylcyclohexane; esters, e.g., ethyl acetate; and carboxylic acids, e.g. acetic acid. The reaction may be carried out under ordinary pressure or increasing pressure. The reaction temperature is not critical but the reaction is preferably carried out at room temperature. The reaction ends when the absorption of hydrogen gas ceases. After completion of the reaction, the desired product is separated from the reaction mixture by a conventional means. For instance, the desired product may be obtained by removing the catalyst from the reaction mixture and distillating the solvent. The crude product is, if necessary, further purified by a conventional means, for example, column chromatography and thin layer chromatography.

The ester compounds having the Formula I wherein $R^2$ is an alkyl group are, if desired, hydrolyzed with a conventional means to give the carboxylic acid compounds having the Formula I wherein $R^2$ is hydrogen atom. For instance, the ester compounds are treated with a mineral acid, for example, hydrochloric acid, hydrobromic acid and sulfuric acid or an alkali or alkaline earth metal hydroxide, for example, sodium hydroxide, potassium hydroxide and barium hydroxide in the presence of water or aqueous alcohols, e.g., aqueous methanol and aqueous ethanol or aqueous ethers, e.g., aqueous tetrahydrofuran and aqueous dioxane. The carboxylic acid compounds are, if desired, converted to the pharmaceutically acceptable salts described above by conventional procedures described in the chemical literature.

The Compounds III employed as a starting material are novel and prepared according to the following reaction sequence:

(1) Preparation of 15-oxoprost-13-enoic acid

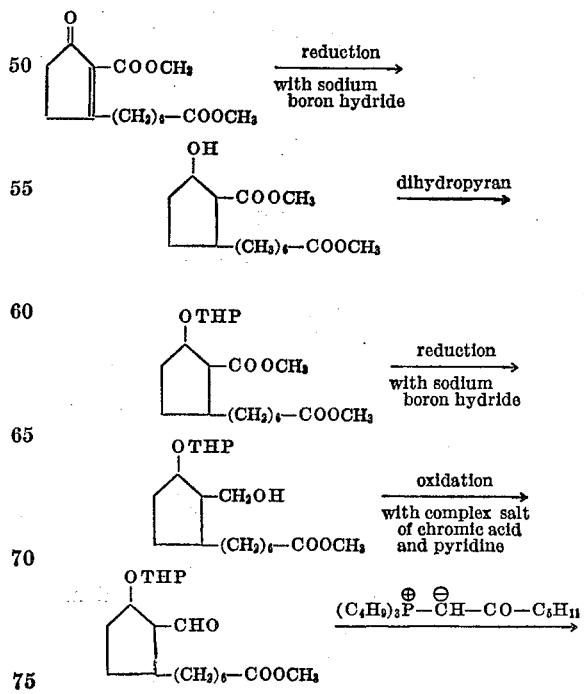

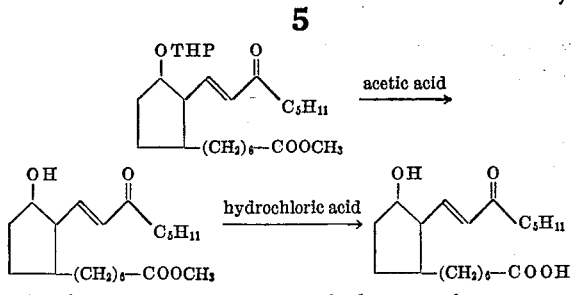

wherein THP represents 2-tetrahydropyranyl group.

(2) Preparation of 15-oxoprost-13-enoic acid, 15-oxoprost - 11,13 - dienoic acid and 15-oxoprost-8(12),13-dienoic acid

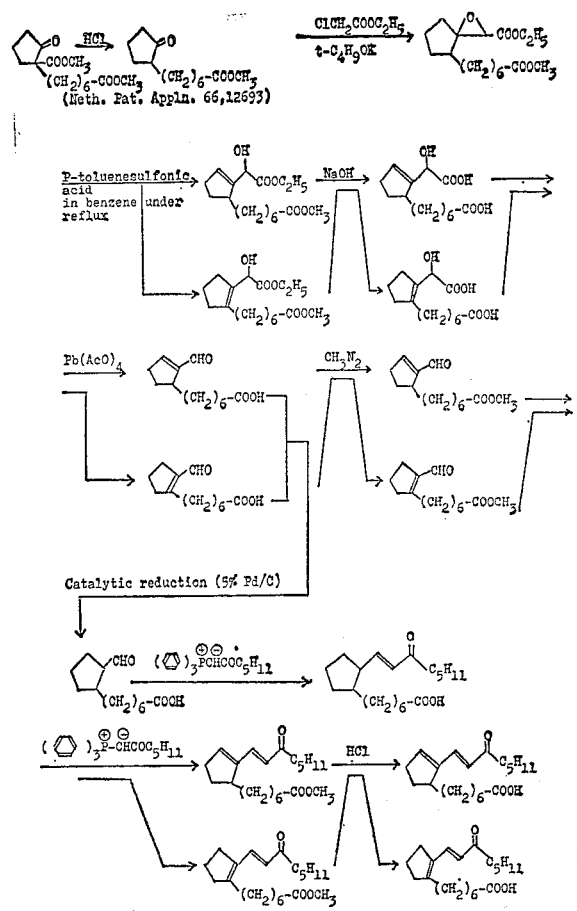

The other compounds having the Formula III are prepared by the same procedure as described above.

The following examples are presented to further illustrate the present invention.

EXAMPLE 1

15-oxoprostanoic acid (1) In 20 ml. of ethanol is dissolved 411 mg. of 15-oxoprost-13-enoic acid and to the solution is added 400 mg. of 5% palladium on charcoal. The mixture is reduced in a hydrogen atmosphere. After completion of the absorption of hydrogen gas, the reaction mixture is filtered and the filtrate is concentrated in reduced pressure. The oily concentrate is chromatographed on 8 g. of silica gel and eluted with benzene for a while and next with benzene containing 5-10% ether successively. The eluates with the latter solvent are collected and the solvent is distilled off to give 375 mg. of the pure desired product as oil.

I.R. (liquid film) $\gamma$ max.$^{cm-1}$:
    3100–3400 (broad), 1705–1730 (broad)
Mass spectrum M$^{\oplus}$:324 ($C_{20}H_{36}O_3$)

(2) In 20 ml. of ethanol is dissolved 305 mg. of a mixture of 15-oxoprost-8(12), 13-dienoic acid and 15-oxoprost-11,13-dienoic acid and to the solution is added 600 mg. of 5% palladium on charcoal. The mixture is reduced in a hydrogen atmosphere. After completion of the absorption of hydrogen gas, the reaction mixture is filtered and the filtrate is concentrated in a reduced pressure. The oily concentrate is chromatographed on 6 g. of silica gel and eluted with benzene for a while and next with benzene containing 5% ether. The eluates with the latter solvent are collected and the solvent is distilled off to give 170 mg. of the pure desired product as oil.

The infrared absorption spectrum and mass spectrum of the product thus obtained are the same as those of the product obtained in above (I).

EXAMPLE 2

Methyl 15-oxoprostanoate (1) In 20 ml. of methanol is dissolved 390 mg. of methyl 15-oxoprost-13-enoate and to the solution is added 100 mg. of 5% palladium on charcoal. The mixture is reduced in a hydrogen atmosphere. 26 m. of hydrogen gas is absorbed over about ten minutes. The reaction mixture is filtered and the filtrate is concentrated in reduced pressure. The oily concentrate is chromatographed on 5 g. of silica gel and eluted with benzene for a while and next with benzene containing 0.5–2% ether successively. The eluates with the latter solvent are collected and the solvent is distilled off to give 367 mg. of the pure desired product as oil.

I.R. (liquid film) $\gamma$max.$^{cm-1}$: 1750, 1720.
Mass spectrum M$^{\oplus}$:338 ($C_{21}H_{38}O_3$)
N.M.R. (CDCl$_3$) $\delta$:p.p.m.
    3.66 (3H, singlet, —COOC$\underline{H}_3$)

(2) In 20 ml. of ethanol is dissolved 311 mg. of methyl 15-oxoprost-8(12),13-dienoate and to the solution is added 600 mg. of 5% palladium on charcoal. The mixture is reduced in a hydrogen atmosphere. After completion of the absorption of hydrogen gas, the reaction mixture is filtered and the filtrate is concentrated. The concentrate is chromatographed on 6 g. of silica gel and eluted with benzene for a while and next with benzene containing 10% hexane. The eluates with the latter solvent are collected and the solvent is distilled off to give 240 mg. of the pure desired product as oil.

I.R. (Nujol mull) $\gamma$ max.$^{cm-1}$: 1730
N.M.R. (CDCl$_3$) $\delta$:p.p.m.
    3.7 (3H, singlet, —COOC$\underline{H}_3$)
Mass spectrum M$^{\oplus}$:338 ($C_{21}H_{38}O_3$)

EXAMPLE 3

Methyl 11-(2-tetrahydropyranyloxy)-15-oxoprostanoate

In 5 ml. of methanol is dissolved 95 mg. of methyl 11-(2-tetrahydropyranyloxy)-15-oxoprost-13-enoate and to the solution is added 100 mg. of 5% palladium on charcoal. The mixture is reduced in a hydrogen atmosphere. After completion of the absorption of hydrogen gas, the reaction mixture is filtered and the filtrate is concentrated in reduced pressure. The residue is chromatographed on 1 g. of silica gel and eluted with benzene containing 1% ethyl acetate. The eluates are collected and the solvent is distilled off to give 83 mg. of the desired product as oil.

I.R. (liquid film) $\gamma$ max.$^{cm-1}$: 1740, 1720, 1025

EXAMPLE 4

Methyl 11-hydroxy-15-oxoprostanoate

In 5 ml. of methanol is dissolved 73 mg. of methyl 11-hydroxy-15-oxoprost-13-enoate and to the solution is added 100 mg. of 5% palladium on charcoal. The mixture is reduced in a hydrogen atmosphere. After completion of the absorption of hydrogen gas, the reaction mixture is filtered and the filtrate is concentrated in reduced pressure. The residue is chromatographed on 1 g. of silica gel and eluted with benzene containing 3% ethyl acetate. The eluates are collected and the solvent is distilled off to give 60 mg. of the desired product as oil.

I.R. (liquid film) $\gamma$ max.$^{cm-1}$: 3440, 1740, 1718
N.M.R. (CDCl$_3$) $\tau$:
 9.00 (3H, triplet, —C$\underline{H}_3$)
 6.19 (3H, singlet, —COOC$\underline{H}_3$)
 6.15 (1H, broad, >C$\underline{H}$OH)

REFERENTIAL EXAMPLE (1) Hydrolysis of methyl 15-oxoprostanoate 400 mg. of methyl 15-oxoprostanoate is added to a methanol solution containing 5% potassium hydroxide. The mixture is stirred at room temperature for 4 hours. After completion of the reaction, the reaction mixture is neutralized by addition of 10% aqueous hydrochloric acid solution and extracted with ether. The extract is washed with water and dried over anhydrous sodium sulfate. The solvent is distilled off to give the oily desired product. The oil is chromatographed on 10 g. of silica gel and eluted with benzene for a while and next with benzene containing 5–10% ether successively. The eluates with the latter solvent are collected and the solvent is distilled off to give 332 mg. of 15-oxoprostanoic acid. The infrared absorption spectrum and mass spectrum of the product obtained are the same as those of the product obtained in Example 1 (1).

(2) Hydrolysis of methyl 11-hydroxy-15-oxoprostanoate 37 mg. of methyl 11-hydroxy-15-oxoprostanoate is added to 20 ml. of 70% aqueous methanol containing 2% potassium hydroxide. The mixture is stirred at room temperature for 2 hours. After completion of the reaction, water is added to the reaction mixture and the mixture is washed with ether. The aqueous layer is made acidic with acetic acid and extracted with ethyl acetate. The extract is washed with water and dried over anhydrous sodium sulfate. The solvent is distilled off. The residue is chromatographed on 1 g. of silica gel and eluted with benzene containing 20–30% ethyl acetate. The eluates are collected and the solvent is distilled off to give 16 mg. of 11-hydroxy-15-oxoprostanoic acid melting at 57–60° C.

I.R. (liquid film) $\gamma$ max.$^{cm-1}$: 3400, 1710
Mass spectrum M$^\oplus$: 340 (C$_{20}$H$_{36}$O$_4$)
N.M.R. (CDCl$_3$) $\tau$:
 9.17 (3H, triplet, —C$\underline{H}_3$)
 6.20 (1H, broad, >C$\underline{H}$OH)
 4.10 (2H, broad, —COO$\underline{H}$, —O$\underline{H}$)

(3) Hydrolysis of methyl 11-(2-tetrahydropyranyloxy)-15-oxoprostanoate 69 mg. of methyl 11-(2-tetrahydropyranyloxy)-15-oxoprostanoate is dissolved in a mixture of acetic acid and water (6:4) and the solution is stirred at room temperature for 3.5 hours. After completion of the reaction, water is added to the reaction mixture and the mixture is extracted with ethyl acetate. The extract is washed successively with water, aqueous sodium bicarbonate and water and dried over anhydrous sodium sulfate. The solvent is distilled off. The residue is chromatographed on 2 g. of silica gel and eluted with benzene containing 3% ethyl acetate. The eluates are collected and the solvent is distilled off to give 41 mg. of methyl 11-hydroxy-15-oxoprostanoate as oil.

I.R. (liquid film) $\gamma$ max.$^{cm-1}$: 3440, 1740, 1718
N.M.R. (CDCl$_3$) $\tau$:
 9.00 (3H, triplet, —C$\underline{H}_3$)
 6.19 (3H, singlet, —COOC$\underline{H}_3$)
 6.15 (1H, broad, >C$\underline{H}$OH)

(4) Preparation of potassium 15-oxoprostanoate 150 mg. of 15-oxoprostanoic acid is dissolved in a mixture of 5 ml. of methanol and 1 ml. of water and 35 mg. of potassium carbonate is added to the solution. The mixture is stirred at room temperature for one hour. After completion of the reaction, the solvent is distilled off from the reaction mixture under reduced pressure to give 155 mg. of potassium 15-oxoprostanoate as oil.

I.R. (liqiud film) $\gamma$ max.$^{cm-1}$: 1730, 1660, 1540–1570, 970

What is claimed is:
1. A compound having the formula

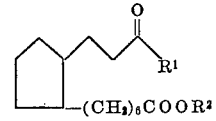

wherein R$^1$ represents a straight or branched alkyl group having from 3 to 7 carbon atoms, R$^2$ represents a hydrogen atom or a straight or branched alkyl group having 1 to 5 carbon atoms, and the pharmaceutically acceptable salts thereof.

2. A compound having the formula

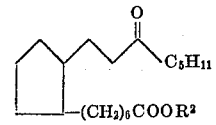

wherein R$^2$ represents a hydrogen atom or a straight or branched alkyl group having 1 to 5 carbon atoms, and the pharmaceutically acceptable salts thereof.

3. 15-oxoprostanoic acid.
4. Methyl 15-oxoprostanoate.
5. Potassium 15-oxoprostanoate.

References Cited

UNITED STATES PATENTS 3,707,548   12/1972   Bagli et al. _____ 260—468 D

OTHER REFERENCES

March—Advanced Organic Chemistry, pp. 591–2 (1967).

ROBERT GERSTL, Primary Examiner

U.S. Cl. X.R.

260—247.2 R, 293.65, 345.7, 345.8, 410.9 R, 413, 448 R, 468 K, 501.1, 501.17, 514 D; 424—305, 317, 318